(12) United States Patent

Boyle et al.

(10) Patent No.: US 12,594,983 B2

(45) Date of Patent: Apr. 7, 2026

(54) ELECTRIC POWER STEERING GEAR WITH AN ANTI-ROTATE FEATURE

(71) Applicant: ZF CV Systems Global GmbH, Bern (CH)

(72) Inventors: Kevin Boyle, Hermitage, TN (US); Caleb Crum, Rossville, IN (US); Benjamin Schoon, Lafayette, IN (US); Zach Robert Volmering, Noblesville, IN (US)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 391 days.

(21) Appl. No.: 18/470,460

(22) Filed: Sep. 20, 2023

(65) Prior Publication Data

US 2025/0091639 A1 Mar. 20, 2025

(51) Int. Cl.
B62D 5/04 (2006.01)

(52) U.S. Cl.
CPC ................................. B62D 5/0448 (2013.01)

(58) Field of Classification Search
CPC ... B62D 3/00; B62D 3/02; B62D 3/04; B62D 3/06; B62D 3/08; B62D 3/12; B62D 3/123; B62D 3/126; B62D 5/02; B62D 5/043; B62D 5/0442; B62D 5/0445; B62D 5/0448; B62D 5/0451; B62D 5/0454
USPC ......................................... 180/433, 443, 444
See application file for complete search history.

(56) References Cited

U.S. PATENT DOCUMENTS

| | | | | |
|---|---|---|---|---|
| 5,957,236 A | * | 9/1999 | Kitazawa | B62D 5/0445 |
| | | | | 180/444 |
| 7,322,607 B2 | * | 1/2008 | Yamada | F16C 33/58 |
| | | | | 280/755 |
| 8,398,496 B2 | * | 3/2013 | Bahr | B62D 1/16 |
| | | | | 464/167 |
| 9,227,655 B2 | * | 1/2016 | Lee | B62D 6/10 |
| 9,279,483 B2 | * | 3/2016 | Wu | F16H 25/20 |
| 9,611,846 B2 | * | 4/2017 | Underwood | E21B 4/02 |
| 11,046,355 B2 | * | 6/2021 | Yeom | B62D 5/0469 |

(Continued)

FOREIGN PATENT DOCUMENTS

| | | | | |
|---|---|---|---|---|
| DE | 4207668 A1 | * | 9/1993 | B62D 5/08 |
| JP | 2022181439 A | * | 12/2022 | F16H 25/2204 |

(Continued)

*Primary Examiner* — Joshua E Rodden

(74) *Attorney, Agent, or Firm* — LEYDIG, VOIT & MAYER, LTD.

(57) ABSTRACT

An electric powered steering assembly includes a housing with a cylindrical portion, an interior wall of the cylindrical portion defining a first and second grooves extending in an axial direction, the first and second grooves having inwardly tapered walls. A ball screw is disposed in the housing, extending in the axial direction, and defining a through hole extending in a radial direction having a first and second ends. A ball nut is disposed in the housing surrounding the ball screw and configured to rotate relative to the housing. A first anti-rotational pin is disposed in the first end of the through hole, a second anti-rotational pin is situated in the second end of the through hole, and a spring is disposed between the anti-rotational pins. The spring is configured to bias the first and second anti-rotational pins in a radially outward direction towards the first and the second groves respectively.

12 Claims, 5 Drawing Sheets

(56)        References Cited

U.S. PATENT DOCUMENTS

| | | | | |
|---|---|---|---|---|
| 11,465,682 B2 * | 10/2022 | Walentowski | .......... | G01L 5/221 |
| 11,524,714 B2 * | 12/2022 | Hafermalz | .............. | F16C 23/06 |
| 11,554,806 B2 * | 1/2023 | Terashima | .......... | B62D 5/0424 |
| 11,644,066 B2 * | 5/2023 | Capela | .................... | F16C 29/04 |
| | | | | 464/162 |
| 11,745,788 B2 * | 9/2023 | Shin | .................... | F16H 25/2015 |
| | | | | 180/402 |
| 2006/0169527 A1 * | 8/2006 | Lim | ......................... | B62D 3/12 |
| | | | | 180/444 |
| 2007/0068726 A1 * | 3/2007 | Shimizu | .................. | G01L 3/102 |
| | | | | 180/444 |
| 2009/0114470 A1 * | 5/2009 | Shimizu | ................... | B62D 5/04 |
| | | | | 180/444 |
| 2023/0085431 A1 * | 3/2023 | Ahn | ...................... | F16H 57/039 |
| | | | | 180/444 |
| 2023/0313869 A1 * | 10/2023 | Case | .................... | B62D 5/0445 |
| | | | | 180/444 |
| 2024/0359727 A1 * | 10/2024 | Schoon | ............... | F16C 11/0604 |
| 2025/0282411 A1 * | 9/2025 | Eßer | .................... | B62D 5/0445 |
| 2025/0282414 A1 * | 9/2025 | Schoon | ............... | B62D 5/0448 |
| 2025/0282415 A1 * | 9/2025 | Schoon | ............... | B62D 5/0448 |
| 2025/0282416 A1 * | 9/2025 | Schoon | ................ | F16C 33/122 |

FOREIGN PATENT DOCUMENTS

| | | | | | | |
|---|---|---|---|---|---|---|
| JP | 2023043475 A | * | 3/2023 | | | |
| JP | 2025035314 A | * | 3/2025 | | | |
| WO | WO-2021009964 A1 | * | 1/2021 | .............. | F16C 35/02 |

* cited by examiner

102

100

ELECTRIC POWER STEERING GEAR WITH AN ANTI-ROTATE FEATURE

FIELD

The present disclosure relates to a steering gear for a vehicle with an anti-rotate feature.

BACKGROUND

Commercial vehicles that use Electric Powered Steering (EPS). Electric Powered Steering is implemented using an electric power steering gear. The electric power steering gear utilizes a ball nut to provide a ball screw with linear translation. This linear translation motion of the ball screw turns the tires to steer the path of the vehicle. To keep the ball screw from turning with the ball nut, an anti-rotational feature engages the gear housing to rotationally fix the ball screw relative to the housing. Current anti-rotational methods include a male spline on the ball screw and a female spline fixed to the gear housing. One such example is a pin in a hole through the ball screw that engages in an axial groove in the gear housing, permitting it to slide along the axial groove while prohibiting rotation relative to the gear housing. However, conventional methods do not prevent undesirable free rotational movement (referred to as lash) due to manufacturing tolerances and normal wear due to use.

SUMMARY

Current anti-rotational features permit a small amount of play between a ball screw and housing of a steering mechanism, also known as lash, due to normal wear and tear and manufacturing tolerances.

Embodiments of the present disclosure provide, in a first aspect, an electric powered steering assembly for a commercial vehicle, comprising: a housing including a cylindrical portion extending in an axial direction, an interior wall of the cylindrical portion defining a first groove and a second groove extending in the axial direction, the first and second grooves having inwardly tapered walls; a ball screw disposed in the housing, extending in the axial direction, and defining a through hole extending in a radial direction having a first and second ends; a ball nut disposed in the housing surrounding the ball screw and configured to rotate relative to the housing; a first anti-rotational pin having at least one tapered end disposed in the first end of the through hole; a second anti-rotational pin having at least one tapered end disposed in the second end of the through hole; and a spring disposed between the first anti-rotational pin and the second anti-rotational pin and configured to bias the first anti-rotational pin and the second anti-rotational pin in a radially outward direction towards the first and the second groves respectively so that the at least one tapered end of the first anti-rotational pin and the at least one tapered end of the second anti-rotational pin engage the first and second grooves respectively and thereby restrict rotation of the ball screw relative to the housing.

According to an implementation of the first aspect, the first and second grooves inwardly taper at a first angle.

According to an implementation of the first aspect, the at least one tapered end of the first anti-rotational pin and the at least one tapered end of the second anti-rotational pin taper at the first angle to match the taper of the first and second grooves respectively.

According to an implementation of the first aspect, the ball nut is configured to rotate over the ball screw and engage threads of the ball screw.

According to an implementation of the first aspect, the rotation of the ball nut over the ball screw results in an axial translation of the ball screw in a right or left direction based on a rotational direction of the ball nut.

According to an implementation of the first aspect, engaging the first and second grooves with the first and second anti-rotational pins restricts the rotation of the ball screw relative to the ball nut.

A second aspect of the present disclosure provides a method of providing a lash-free electric powered steering gear for a commercial vehicle, the method comprising: providing a housing including a cylindrical portion extending in an axial direction, an interior wall of the cylindrical portion defining a first groove and a second groove extending in the axial direction, the first and second grooves having inwardly tapered walls; providing a ball screw disposed in the housing, extending in the axial direction, and defining a through hole extending in a radial direction having a first and second ends; providing a ball nut disposed in the housing surrounding the ball screw and configured to rotate relative to the ball screw; providing a first anti-rotational pin having at least one tapered end disposed in the first end of the through hole; providing a second anti-rotational pin having at least one tapered end disposed in the second end of the through hole; and exerting a radially outward force on the first anti-rotational pin and the second anti-rotational pin using a spring disposed between the first anti-rotational pin and the second anti-rotational pin so as to bias the first anti-rotational pin and the second anti-rotational pin in a radially outward direction towards the first and the second groves respectively, so that the at least one tapered end of the first anti-rotational pin and the at least one tapered end of the second anti-rotational pin engage the first and second grooves respectively and thereby restrict rotation of the ball screw relative to the housing.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following.

DETAILED DESCRIPTION

Figure 1:
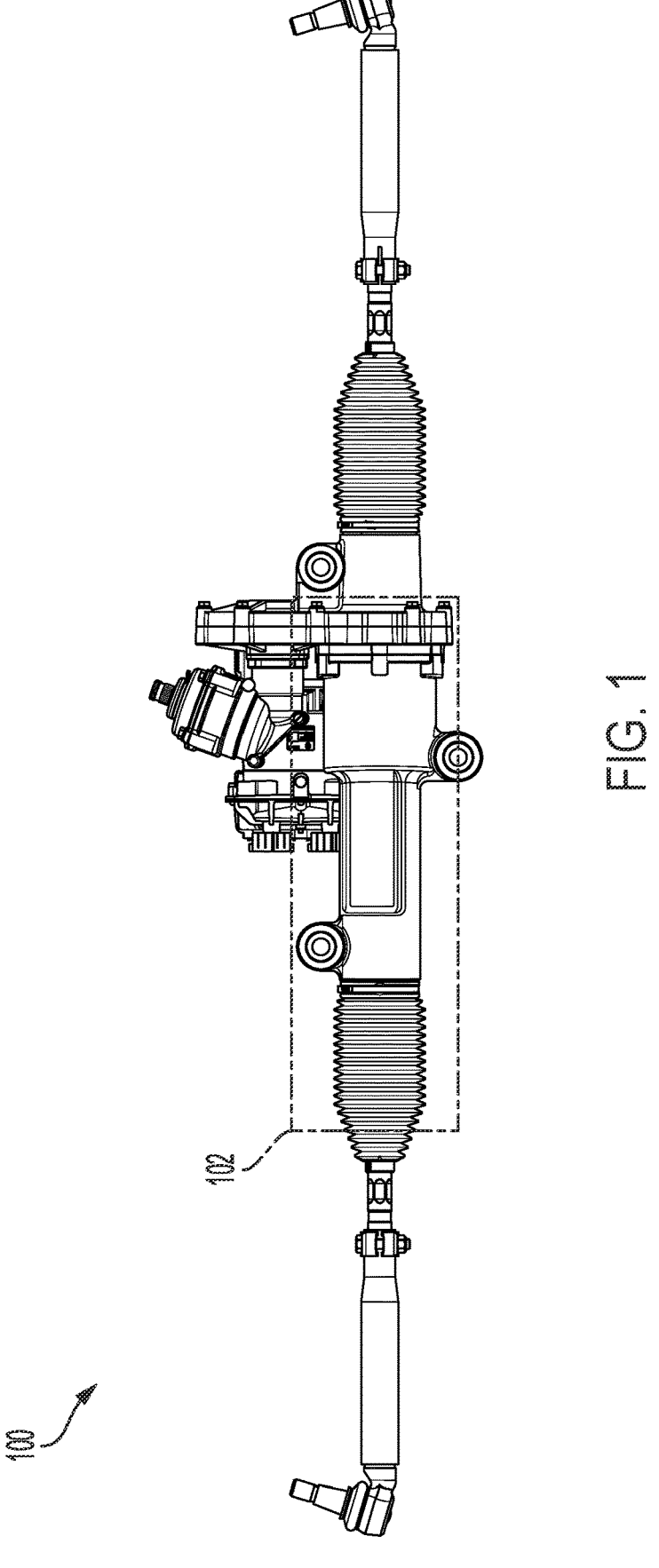
FIG. 1 illustrates an overview of a gear assembly of a vehicle, according to one or more examples of the present disclosure.

Examples of the presented application will now be described more fully hereinafter with reference to the accompanying FIGs., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Commercial vehicles use Electric Powered Steering (EPS) gears for steering. EPS gears include a ball screw oriented transversely to the vehicle and disposed within a gear housing and a ball nut surrounding the ball screw in the housing. Upon receiving steering commands from a driver, the EPS gear of the vehicle comprising the ball nut and ball screw is configured transfer the steering command from the driver to the wheels of the vehicle. For example, upon receiving the steering command from a driver, the ball nut is configured to rotate around the ball screw. Due to the threading of the ball screw and ball nut, rotation of the ball nut causes the ball screw to translate in the right or left direction depending on the rotational direction of the ball nut. The translation of the ball screw causes the wheels of the vehicle to turn, thereby steering the vehicle. In order to facilitate the translation of the ball screw, the ball screw has an anti-rotational feature that prevents the ball screw from rotating relative to the housing. However, due to manufacturing tolerances and normal wear, conventional anti-rotational feature permit a small amount of play between the ball screw and housing, also known as lash.

One possible way to avoid lash in the electric power steering gear is to use anti-rotational pins having tapered ends with the ball screw. Two anti-rotational pins with tapered ends are placed in a common through hole that extends radially through the ball screw so that their tapered ends face in a radially outward direction from the center of the ball screw. The inner cylindrical wall of the housing includes two grooves extending axially that are configured to receive the tapered ends of the two anti-rotational pins. The grooves include tapered groove walls corresponding to the tapered ends of the anti-rotational pins. The angle of tapering in the grooves is same as the angle of tapering on the two anti-rotational pins. A spring is placed between the two anti-rotational pins in the ball screw so as to bias the two anti-rotational pins in the radially outward direction and to hold the anti-rotational pins in contact with the grooves and to ensure a tight fit between pins and the grooves. This arrangement of the anti-rotational pins prevents the ball screw from rotating relative to the housing and eliminates lash, while permitting axial movement of the ball screw relative to the housing.

FIG. 1 illustrates an overview of a gear assembly of a vehicle, according to one or more examples of the present disclosure. The gear assembly 100 depicted in FIG. 1 is responsible for providing the steering functionality to the vehicle. Section 102 of the gear assembly 100 shown in FIG. 1 comprises a ball screw and a ball nut, which is discussed in more detail in FIGS. 2-5.

Figure 2:
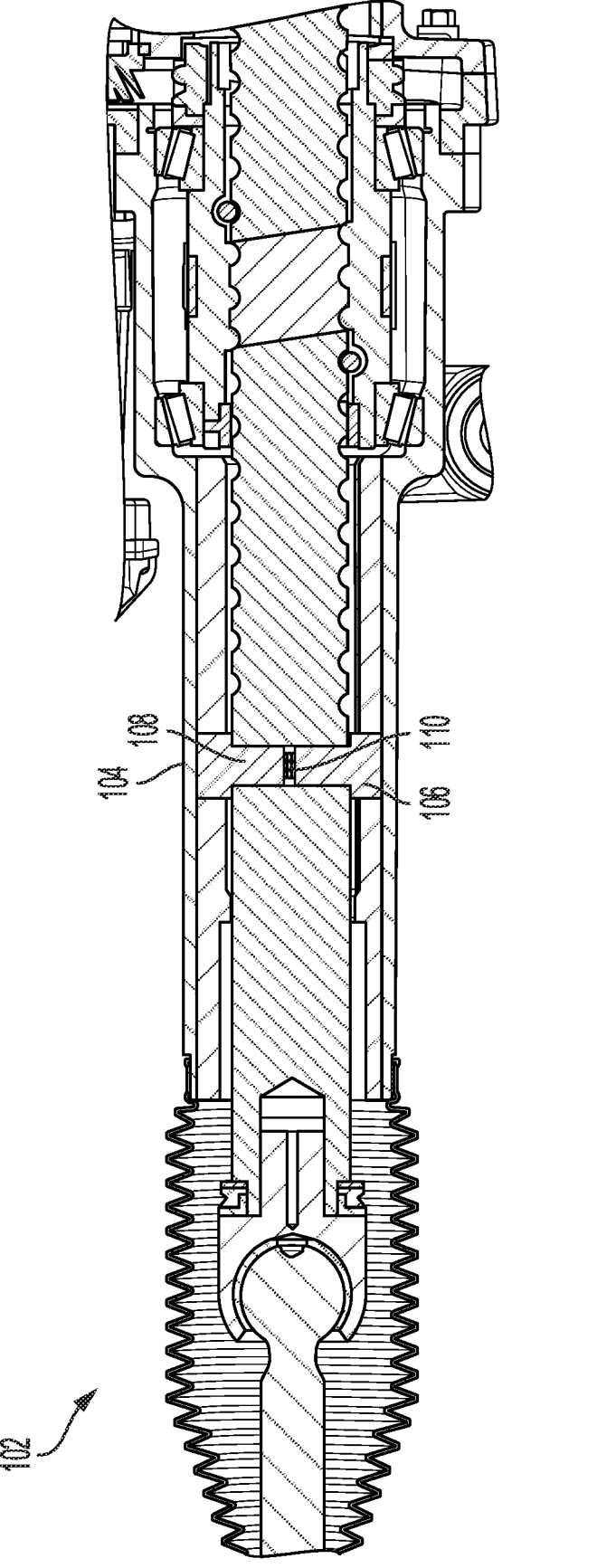
FIG. 2 illustrates a side cross-section view of a portion of the complete gear assembly of the vehicle, according to one or more examples of the present disclosure.

FIG. 2 illustrates a side cross-section view of a portion of the complete gear assembly of the vehicle, according to one or more examples of the present disclosure. Portion 102 of the gear assembly 100 includes a housing 104 of the gear assembly that is cylindrically shaped and extends transversely to the vehicle. A ball screw and ball nut (shown in more detail in FIGS. 3 and 5) are present in the housing 104. The ball nut and the ball screw are configured to convey the steering commands received from a driver to the wheels of the vehicle to steer the vehicle. In order to hold the ball screw grounded to the housing 104, the housing 104 includes two tapered grooves to receive corresponding anti-rotational pins. The grooves of the housing 104 are tapered at the same angle as the taper of the anti-rotational pins 108 and 106 and extend the length of the housing 104. Anti-rotational pins 106 and 108 are disposed in a through-hole that extends in a radial direction through the ball screw. A spring 110 is disposed between the two anti-rotational pins 106 and 108 to bias the anti-rotational pins 106 and 108 in a radially outward direction so that the pins engage with the corresponding grooves in the housing 104. By engaging with the grooves, the anti-rotational pins 106 and 108 prevent the ball screw from rotating relative to the housing when the ball nut rotates, but permit the ball screw to translate axially in the housing. When the ball nut rotates and the ball screw is held stationary using the anti-rotational pins 106 and 108, the relative rotation between the ball nut and the ball screw causes translation of the ball screw in an axial direction relative to the housing. Because the tapered ends of each anti-rotational pin is biased toward the groove having corresponding tapered sides, a constant tight fit is ensured, thereby eliminating lash of the ball screw relative to the housing.

Figure 3:
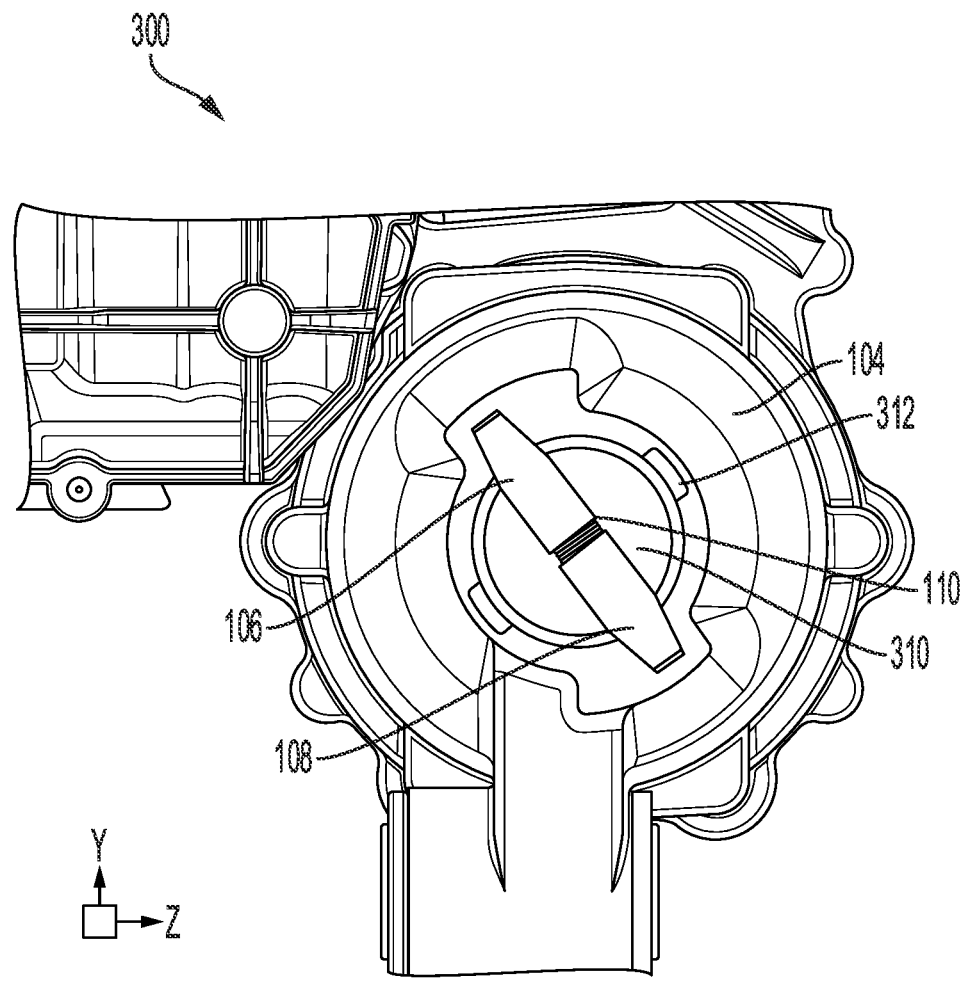
FIG. 3 illustrates a front cross-section view of a housing of the gear assembly of the vehicle, according to one or more examples of the present disclosure.

FIG. 3 illustrates a front cross-section view of a housing of the gear assembly of the vehicle, according to one or more examples of the present disclosure. As disclosed with respect to FIG. 2, the housing 104 includes a ball screw 310 and the ball nut 312. The housing 104 of the gear assembly includes two tapered grooves on opposite ends. The angle of taper of the grooves in the housing 104 of the gear assembly matches the angle of taper on the anti-rotational pins 106 and 108. Two anti-rotational pins 106 and 108 are placed in a through hole of the ball screw 310 and inserted in the two tapered grooves of the housing 104. A spring 110 is placed between the two anti-rotational pins 106 and 108 to provide a radial outward force to hold the anti-rotational pins 106 and 108 in constant contact with the housing 104 of the gear assembly. The forces applied on the anti-rotational pins 106 and 108, the ball screw 310, and the ball nut 312 are discussed in more detail in FIG. 4.

Figure 4:
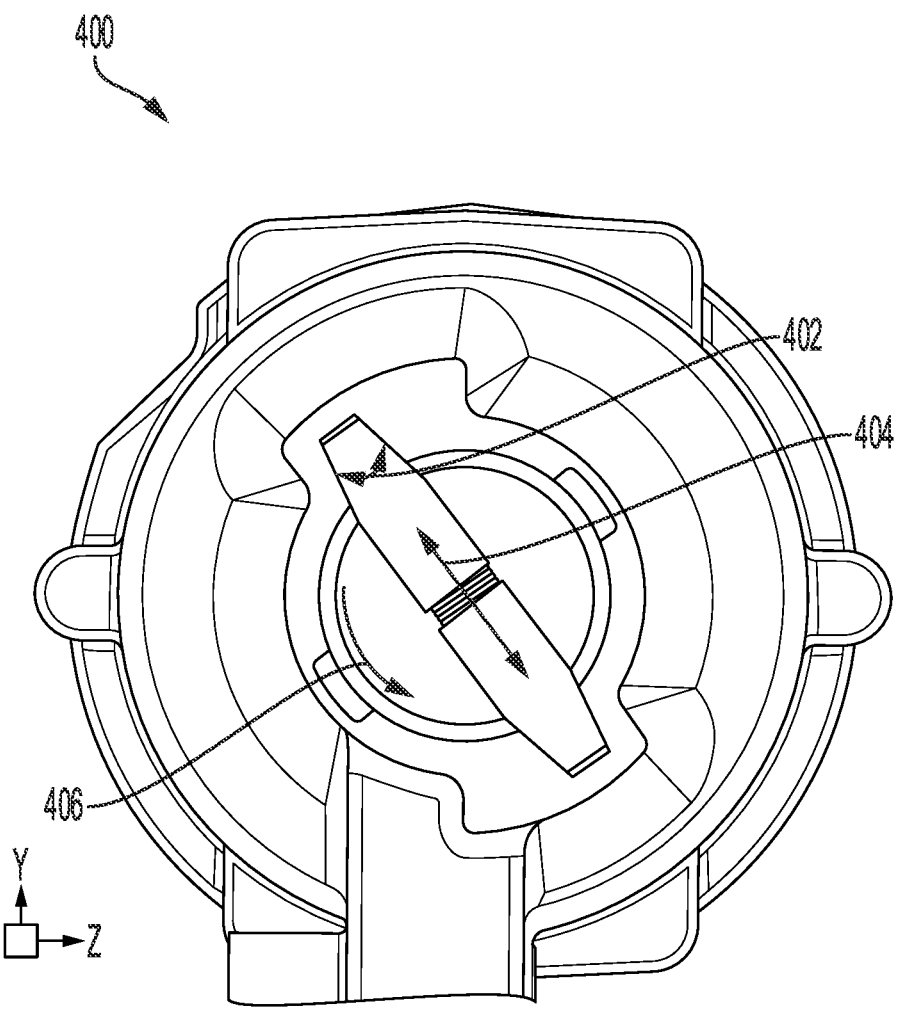
FIG. 4 illustrates another front cross-section view of a housing of the gear assembly of the vehicle, according to one or more examples of the present disclosure.

FIG. 4 illustrates another front cross-section view of a housing of the gear assembly of the vehicle, according to one or more examples of the present disclosure. FIG. 4 is similar to FIG. 3, except that FIG. 4 discusses the forces at play between the anti-rotational pins 106 and 108, the ball screw 310, the ball nut 312, and the housing 104 of the gear assembly, as shown in FIG. 3. Arrows 402 highlight the taper angle of the anti-rotational pins 106 and 108 and the corresponding grooves in the housing 104. The taper angle of the anti-rotational pins 106 and 108 is similar to the taper angle of the corresponding grooves in the housing 104. The spring 110 placed between the anti-rotational pins 106 and 108 provides a radial force highlighted by arrow 404 that ensures that the anti-rotational pins 106 and 108 are constantly in contact with the grooves created in the housing 104. Because the end of the groove is slightly narrower than the end of anti-rotational pins, spring ensures a constant tight fit between the tapered surfaces of each pin and the tapered walls of each groove. Arrow 406 depicts the rotational direction of the ball nut 312, which may be in either direction. As the ball nut 312 rotates relative to the ball screw, the threading of the ball nut and the ball screw causes, the ball screw to translate in an axial direction.

Figure 5:
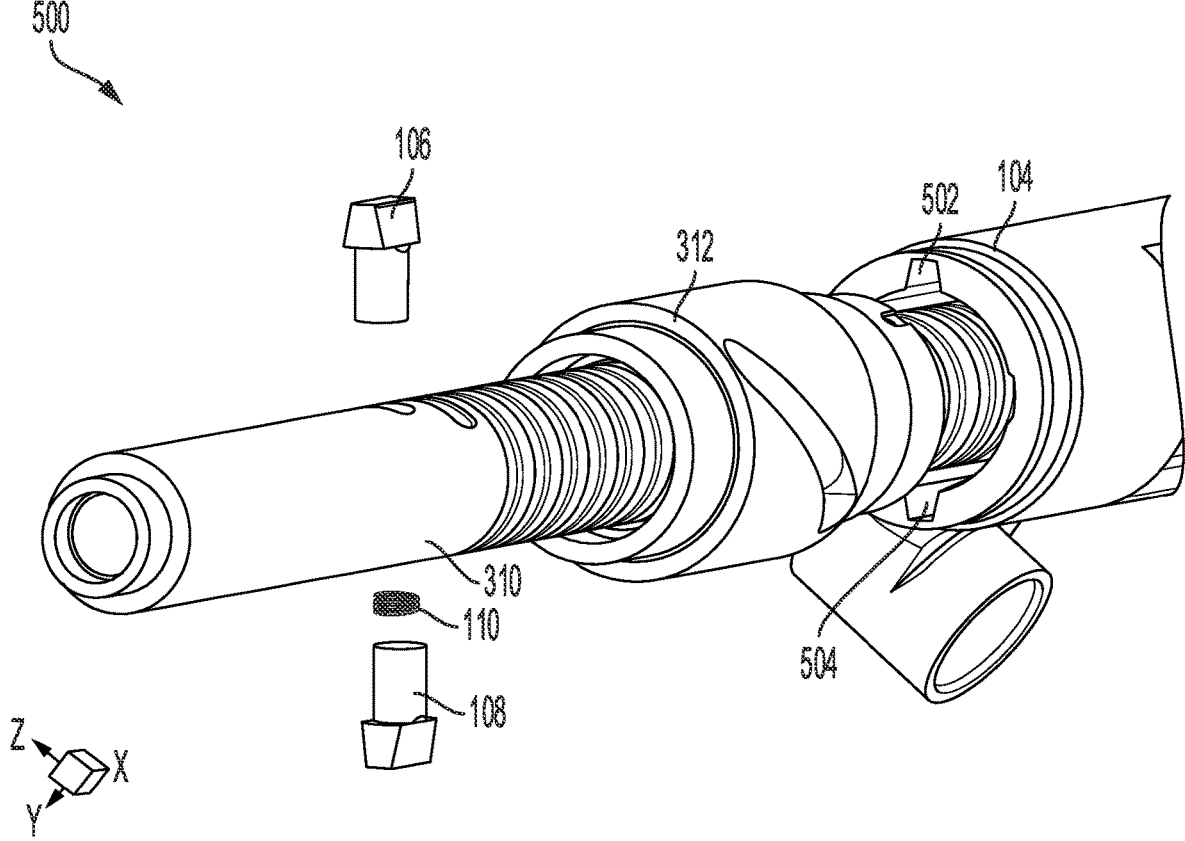
FIG. 5 illustrates a perspective view of a portion of the complete gear assembly of the vehicle, according to one or more examples of the present disclosure.

FIG. 5 illustrates a perspective view of a portion of the complete gear assembly of the vehicle, according to one or more examples of the present disclosure. Perspective view 500 depicts a housing 104 of the gear assembly. The housing 104 of the gear assembly is cylindrically shaped and extends in an axial direction. Ball screw 310 extends axially within the housing 104. Ball nut 312 is configured to rotate relative to the ball screw 310 and engage the threads of the ball screw 310. In some embodiments, the ball nut 312 may be housed in a portion of the housing 104 that permits rotation of the ball nut 312, while restricting translation of the ball nut 312. Anti-rotational pins 106 and 108 are placed in a through hole that extends radially through the ball screw 310. Spring 110 placed between the anti-rotational pins 106 and 108 provides an outward radial force that ensures that the anti-rotational pins 106 and 108 are in constant tight contact with the grooves 502 and 504 in an inner wall of the housing 104 that extend axially. Grooves 502 and 504 are created on opposite sides of the ball screw 310 corresponding to the open ends of the through-hole in the ball screw and have tapered side walls that taper at the same angle as the tapered surfaces of the anti-rotational pins 106 and 108. Grooves 502 and 504 extend axially along the length of the cylindrical portion of the housing 104. The anti-rotational pins 106 and 108 engaging with the grooves 502 and 504 of the housing 104 restrict any rotation of the ball screw 310 relative to the housing. Thus, because the rotation of the ball screw 310 is restricted, the circumferential rotation of the ball nut 312 results in translation of the ball screw in the axial direction.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An electric powered steering assembly for a commercial vehicle, comprising:
a housing including a cylindrical portion extending in an axial direction, an interior wall of the cylindrical portion defining a first groove and a second groove extending in the axial direction, the first and second grooves having inwardly tapered walls;
a ball screw disposed in the housing, extending in the axial direction, and defining a through hole extending in a radial direction having a first and second ends;
a ball nut disposed in the housing surrounding the ball screw and configured to rotate relative to the housing;
a first anti-rotational pin having at least one tapered end disposed in the first end of the through hole;
a second anti-rotational pin having at least one tapered end disposed in the second end of the through hole; and
a spring disposed between the first anti-rotational pin and the second anti-rotational pin and configured to bias the first anti-rotational pin and the second anti-rotational pin in a radially outward direction towards the first and the second groves respectively so that the at least one tapered end of the first anti-rotational pin and the at least one tapered end of the second anti-rotational pin engage the first and second grooves respectively and thereby restrict rotation of the ball screw relative to the housing.

2. The electric powered steering gear of claim 1, wherein the first and second grooves inwardly taper at a first angle.

3. The electric powered steering gear of claim 2, wherein the at least one tapered end of the first anti-rotational pin and the at least one tapered end of the second anti-rotational pin taper at the first angle to match the taper of the first and second grooves respectively.

4. The electric powered steering gear of claim 1, wherein the ball nut is configured to rotate over the ball screw and engage threads of the ball screw.

5. The electric powered steering gear of claim 4, wherein the rotation of the ball nut over the ball screw results in an axial translation of the ball screw in a right or left direction based on a rotational direction of the ball nut.

6. The electric powered steering gear of claim 1, wherein engaging the first and second grooves with the first and second anti-rotational pins restricts the rotation of the ball screw relative to the ball nut.

7. A method of providing a lash-free electric powered steering gear for a commercial vehicle, the method comprising:
providing a housing including a cylindrical portion extending in an axial direction, an interior wall of the cylindrical portion defining a first groove and a second groove extending in the axial direction, the first and second grooves having inwardly tapered walls;
providing a ball screw disposed in the housing, extending in the axial direction, and defining a through hole extending in a radial direction having a first and second ends;
providing a ball nut disposed in the housing surrounding the ball screw and configured to rotate relative to the ball screw;
providing a first anti-rotational pin having at least one tapered end disposed in the first end of the through hole;

providing a second anti-rotational pin having at least one tapered end disposed in the second end of the through hole; and exerting a radially outward force on the first anti-rotational pin and the second anti-rotational pin using a spring disposed between the first anti-rotational pin and the second anti-rotational pin so as to bias the first anti-rotational pin and the second anti-rotational pin in a radially outward direction towards the first and the second groves respectively so that the at least one tapered end of the first anti-rotational pin and the at least one end of the second anti-rotational pin engage the first and second grooves respectively and thereby restrict rotation of the ball screw relative to the housing.

8. The method of claim 7, wherein the first and second grooves inwardly taper at a first angle.

9. The method of claim 8, wherein the at least one tapered end of the first anti-rotational pin and the at least one tapered end of the second anti-rotational pin taper at the first angle to match the taper of the first and second grooves respectively.

10. The method of claim 7, wherein the ball nut is configured to rotate over the ball screw and engage threads of the ball screw.

11. The method of claim 10, wherein the rotation of the ball nut over the ball screw and engaging the threads of the ball screw results in an axial translation of the ball screw in a right or left direction based on a rotational direction of the ball nut.

12. The method of claim 7, wherein engaging the first and second grooves with the first and second anti-rotational pins restricts the rotation of the ball screw relative to the ball nut.

\* \* \* \* \*